(12) United States Patent
Mahnig et al.

(10) Patent No.: US 6,398,241 B1
(45) Date of Patent: Jun. 4, 2002

(54) SUPPORT ARRANGEMENT FOR MOTOR VEHICLES

(75) Inventors: Fritz Mahnig, Schaffhausen (CH); Guido Rau, Constance (DE)

(73) Assignee: Georg Fischer Fahrzeugtechnik AG, Schaffhausen (CH)

( * ) Notice: Subject to any disclaimer, the term of this patent is extended or adjusted under 35 U.S.C. 154(b) by 0 days.

(21) Appl. No.: 09/634,831

(22) Filed: Aug. 9, 2000

(30) Foreign Application Priority Data

Aug. 11, 1999 (DE) .......................... 199 37 336

(51) Int. Cl.$^7$ ................................. B62D 7/18
(52) U.S. Cl. ................................. 280/93.512
(58) Field of Search .................. 280/124.125, 93.512, 280/93.51, FOR 110; 188/18 A

(56) References Cited

U.S. PATENT DOCUMENTS 4,491,340 A 1/1985 Von Grunberg et al.
5,911,425 A * 6/1999 Hofman et al. ........ 280/93.512

FOREIGN PATENT DOCUMENTS

DE 4139329 6/1992
DE 4241003 6/1994
DE 19538212 4/1997
DE 19638842 4/1998

* cited by examiner

Primary Examiner—Eric Culbreth
(74) Attorney, Agent, or Firm—Bachman & LaPointe, P.C.

(57) ABSTRACT

A support arrangement comprising a first support part for connection to a suspension strut and to a steering device of a motor vehicle, and a second support part for holding a wheel bearing, the first support part and the second support part having wall regions formed in a metal-casting process, the first support part and the second support part being connected to each other by means of screws, two brake support arms being formed on the second support part for attachment of the brake device, and the one brake support arm having wall regions which are formed such that they are substantially thinner than the corresponding wall regions of the other brake support arm. By producing the support arrangement in two parts a considerable saving in weight over producing it in one part can be achieved, with all safety regulations being observed.

8 Claims, 4 Drawing Sheets

SUPPORT ARRANGEMENT FOR MOTOR VEHICLES

BACKGROUND OF THE INVENTION

The invention relates to a support arrangement comprising a first support part for connection to a suspension strut and to a steering device of a motor vehicle, and a second support part for holding a wheel bearing, the first support part and the second support part having wall regions formed in a metal-casting process, the first support part and the second support part being connected to each other by means of screws, and two brake support arms being formed on the second support part for attachment of the brake device.

The construction of motor vehicles combines many component parts which are designed for different functions and accordingly have to satisfy different safety regulations. Any saving in weight in the design is welcome, since this enables a saving during operation of the motor vehicle on an amount of fuel which, under some circumstances, far exceeds the amount of primary energy which has to be used to produce the motor vehicle. A saving in weight and in: fuel is also desirable with regard to protection of the environment. The lower the weight of the vehicle, the lower the weight of the vehicle to the road and the simpler the disposal at the end of the vehicle's working life. However, the saving in weight should not obscure the safety aspects. The individual parts of the motor vehicle have to ensure the greatest possible safety at the least possible weight.

DE 197 42 027 A1 discloses a support arrangement according to the generic type. The support arrangement consists essentially of a first shaped casting which supports the pivot bearing, and of a second shaped casting which holds the wheel bearing for the wheel axle and the wheel flange connected thereto, and has arms for attachment of the brake shoes. The two shaped castings are connected to each other by means of screws. As the two shaped castings are being screwed together, a shoulder projection, which can be deformed plastically, exerts pressure on the end side of the wheel bearing. The first shaped casting, in particular, is made with a relatively large amount of material and having relatively great wall thicknesses, at least in the region between the screw connection and the pivot bearing.

Taking this prior art as the starting point, the object of the invention is to provide a support arrangement for motor vehicles, which arrangement has the greatest possible strength at the smallest possible overall weight, can be produced cost-effectively and allows the use of first generation wheel bearings.

SUMMARY OF THE INVENTION

The foregoing object is achieved by providing a support arrangement comprising a first support part for connection to a suspension strut and to a steering device of a motor vehicle, and a second support part for holding a wheel bearing, the first support part and the second support part having wall regions formed in a metal-casting process, the first support part and the second support part being connected to each other by means of screws, and two brake support arms being formed on the second support part for attachment of the brake device, and the one brake support arm having wall regions which are formed such that they are substantially thinner than the corresponding wall regions of the other brake support arm.

It is advantageous for as little material as possible to be used in the casting process for producing the support arrangement. This is achieved by the one brake support arm having wall regions which are formed such that they are at least 20%, preferably at least 40%, thinner than the corresponding wall regions of the other brake support arm. The brake support arms can differ in design corresponding to the load of the brake device. The arm which supports the small brake shoes which act in the forward direction of travel has to be designed for a substantially greater braking force than the arm for the small brake shoes which act in the rearward direction of travel. This is achieved by further wall regions being formed on the first support part for connection to the suspension strut and to the steering device of a motor vehicle, said wall regions being designed such that they are substantially thinner in some areas than the adjacent wall regions of the second support part, the wall regions of the first support part enclosing an angle of $\alpha < 180°$ with the wall regions of the second support part.

The support arrangement has different wall regions which are formed in a metal-casting process, are arranged adjacent to one another and are designed in such a manner that the support arrangement is able to carry out fairly different functions, for example the connection to the suspension strut and to the steering device of the motor vehicle, the holding of the wheel bearing and the attachment of the brake device.

Because the support arrangement is produced from two support parts which are screwed to each other, in contrast to a support arrangement which is produced from one part four molds instead of two have to be constructed. However, the additional outlay for the construction of the molds and for the screw connection is made up for by obtaining twice the amount of degrees of freedom. Undercuts which are difficult to produce between wall regions which are arranged at an angle to one another and which would require extra mold cores are no longer necessary. At the same time, material and therefore weight can be saved in the region of the undercuts. The location of the sprue can be selected separately for the two support parts and therefore more favorably for the casting and cooling conditions. The mold parting line can also be selected separately for the two support parts and therefore more favorably for their removal from the mold. The separating line between the two support parts can be set in such a manner than an optimum design with regard to safety and saving in weight is possible both for the first support part and for the second support part. Because two individual support parts are produced, an optimum selection of material can be made for each support part corresponding to the stress to which it is subjected. The modular construction enables different component parts to be combined with one another. This combination option gives greater flexibility in production and in storage.

BRIEF DESCRIPTION OF THE DRAWINGS

An exemplary embodiment of the invention is described with reference to the figures, in which.

DETAILED DESCRIPTION OF THE DRAWINGS

Figure 1:
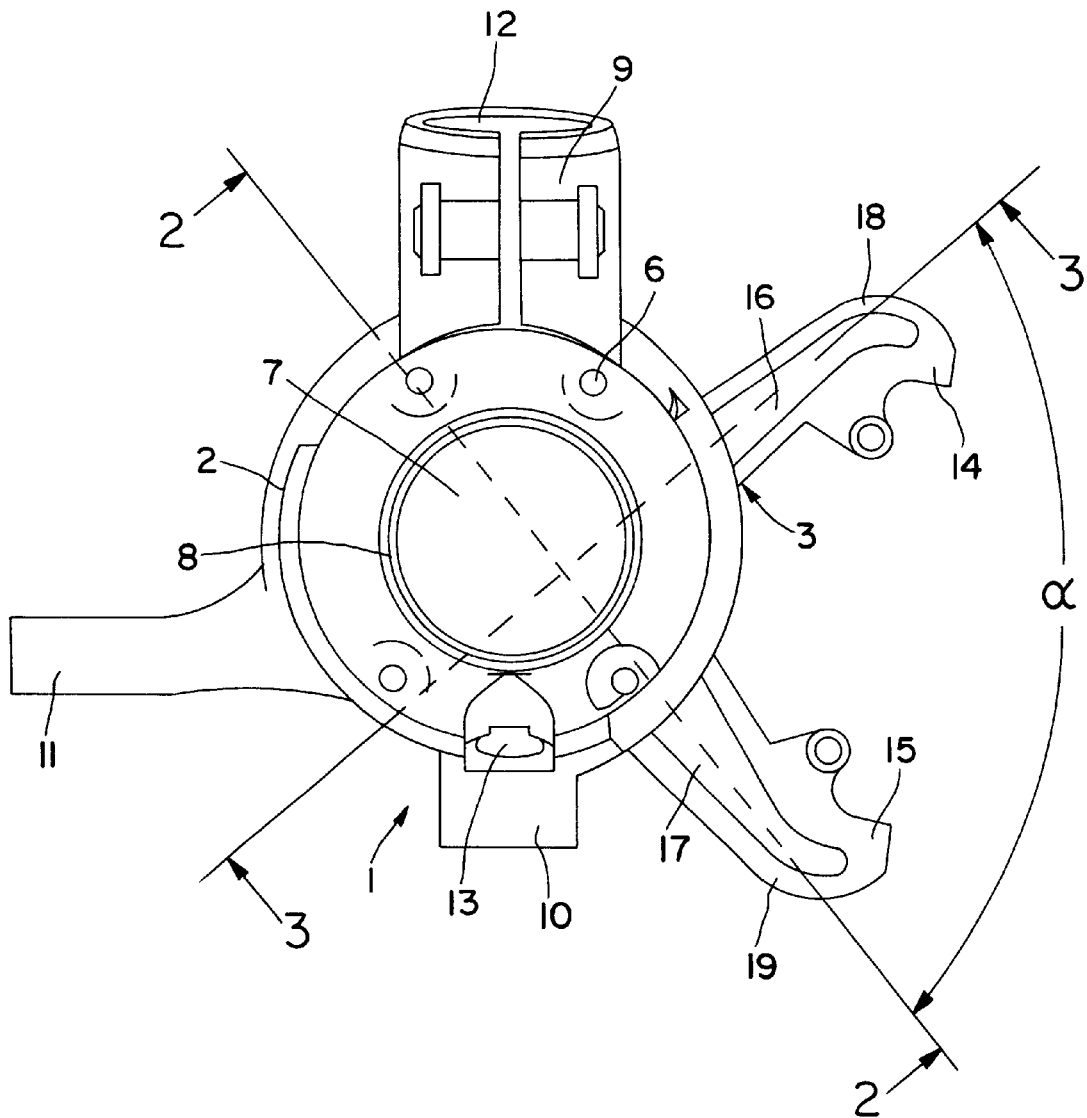
FIG. 1 shows a view of a support arrangement according to the invention.

FIG. 1 shows a support arrangement 1 which is used in a passenger vehicle in order to produce the supporting connection between a drive shaft and a driven wheel. Similar, but more simply constructed support arrangements are also used at the non-driven wheels. The support arrangement 1 is composed of a first support part 2 and a second support part 3. In FIG. 1, the second support part 3 lies below the first support part 2. FIG. 1 shows the support arrangement 1 as viewed from the interior of the vehicle substructure from the drive device toward the driven wheel (not shown). The first support part 2 is connected to the second support part 3 by means of screws 5 (see FIG. 2). In FIG. 1, four holes 6 can be seen into which the screws 5 have been screwed from below, i.e. from the outside, for attachment of the second support part 3, which is at the bottom, i.e. inside the vehicle, to the first support part 2 which is at the top. The support arrangement 1 has a circular opening 7 lying centrally between the holes 6.

The opening 7 has a smaller diameter in the first support part 2 than in a substantial region of the second support part 3. This enables a wheel bearing which can be placed into the opening 7 in the second support part 3 to bump against a stop 8 of the first support part 2. The wheel bearing (likewise not shown here) serves to hold an axle stub of the wheel in a bearing manner. The wheel bearing is clamped and secured between the stop 8 of the first support part 2 and a further stop 28 of the second support part 3 by the screw connection of the first support part 2 to the second support part 3. In the case of a non-driven wheel, the opening 7 in the first support part 2 can be subsequently covered with a cover (not shown). In the case of a driven wheel, the axle stub is connected in the interior of the vehicle to the drive shaft.

The first support part 2 has three attachment or holding regions 9, 10, 11 on the circumference. The first attachment region 9 and the second attachment region 10 are arranged on mutually opposite sides of the opening 7. The first attachment region 9 and the second attachment region 10 have first attachment openings 12 and second attachment openings 13 which run parallel to each other in their axial direction and are arranged at an angle with respect to the axial direction of the axial stub. A connecting part of the suspension strut is held and attached in the first attachment region 9, and a further connecting part of the transverse link is held in the second attachment region 10. The first attachment region 9 has a slot 4 and, on opposite sides of the slot 4, in each case a socket 22 for a clamping screw and a nut (not shown) for the clamping attachment of the suspension strut. Further components of the steering system are attached to the third attachment region 11. The steering system includes, inter alia, a steering tie rod and a steering arm. By this means, the attachment and the setting of the steering geometry of the wheel are achieved.

A first brake support arm 14 and a second brake support arm 15 are formed on the second support part 3. The brake support arms 14, 15 serve for attachment of the brake device. The first brake support arm 14 serves for the attachment of the small brake shoes for the brakes which are required as the vehicle travels in the rearward direction, and the second brake support arm 15 serves for the attachment of the small brake shoes for the brakes which are required in the normal, forward direction of travel. The brake support arms 14, 15 are connected to the second support part 3 by means of an essentially U-shaped profile 16, 17. The first brake support arm 14 has wall regions 18 which are formed such that they are substantially thinner than the corresponding wall regions 19 of the second brake support arm 15. Because the forces which act during braking of the vehicle in the forward direction are much larger than in the rearward direction of the vehicle, the first wall region 18 is formed such that it is at least 20%, preferably at least 40%, thinner than the second wall region 19 (see FIG. 4). This means that considerable savings in weight are possible with all safety regulations being observed.

Further savings in weight are also possible owing to a targeted selection of material for the first support part 2 and the second support part 3. Because the forces which act on the first'support part 2 are generally lower than the forces which act on the second support part 3, the first support part 2 can be produced, for example, from a metal casting of an aluminum or magnesium alloy. Only the second support part 3 which has to absorb the brake forces and which has to hold a first generation wheel bearing made of steel in the opening 7 is produced from a metal casting of a cast iron alloy with nodular graphite.

The design of the support arrangement 1 in two parts enables the materials to be selected in accordance with the function of the support parts 2, 3. Material can also be saved in the design for each support part 2, 3 in a targeted manner wherever the function allows it to be. Material can be omitted which could not be omitted in the case of a conventional casting process in one part, especially because of the complicated geometrical arrangement of the attachment arms 9, 10, 11 and of the brake support arms 15, 16.

Figure 2:
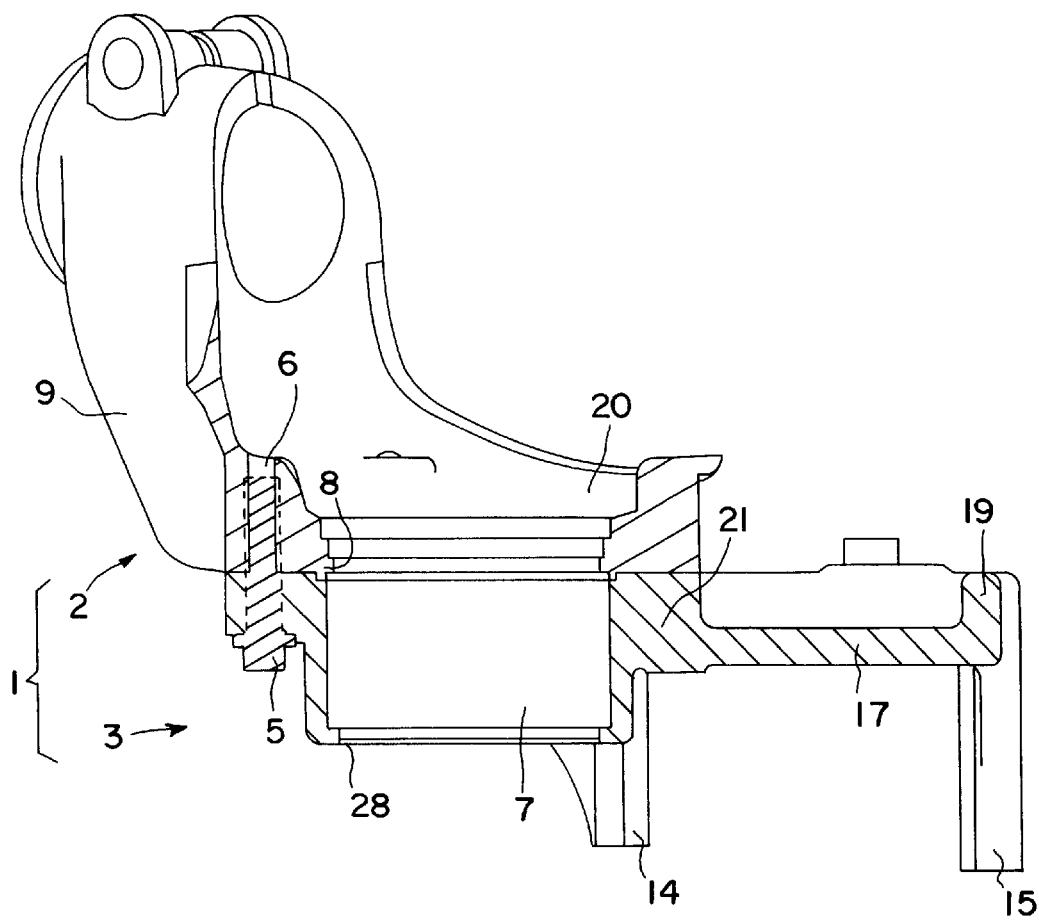
FIG. 2 shows a section through the support arrangement along the line 2—2 of FIG. 1.
Figure 3:
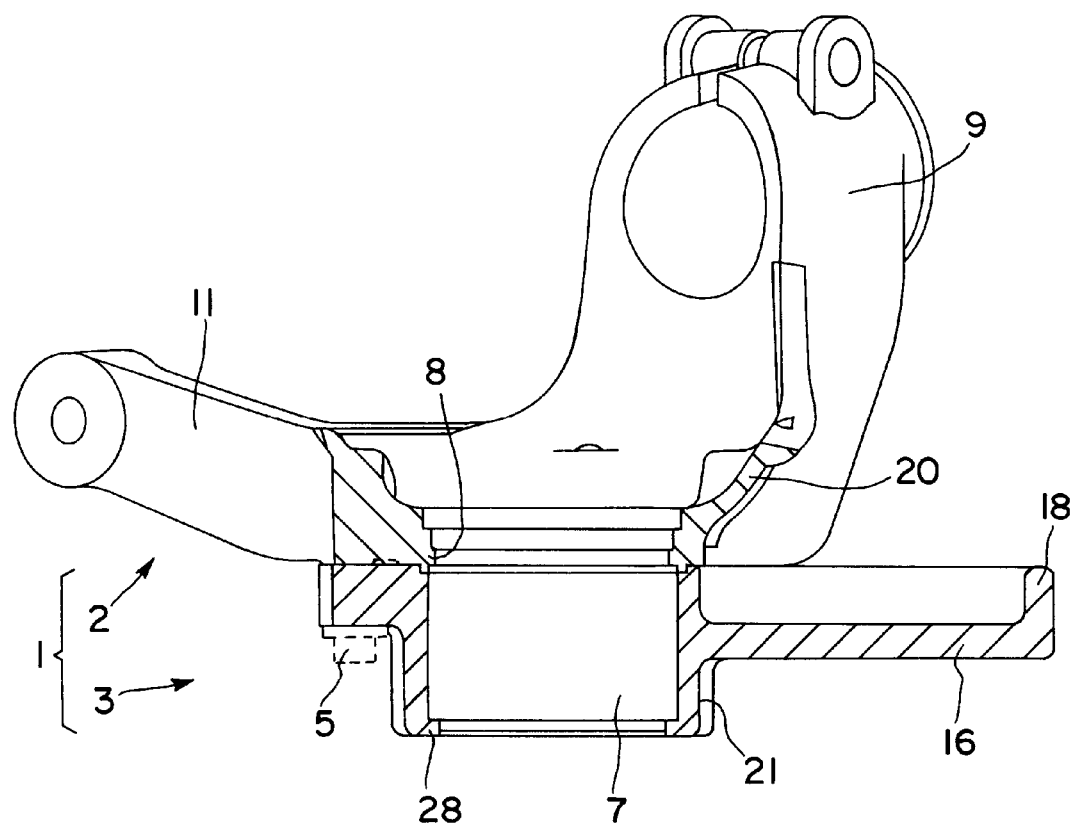
FIG. 3 shows a section through the support arrangement along the line 3—3 of FIG. 1.

FIG. 2 and FIG. 3 show sections through the support arrangement 1 along the line 2—2 and along the line 3—3, respectively, of FIG. 1. The attachment arm 9 for attachment of the suspension strut is shown on the first support part 2. In the section of FIG. 2 it can also be seen how the support parts 2, 3 are connected to each other in holes 6 by means of screws 5. The separating line between the first support part 2 made of light metal and the second support part 3 made of a cast iron alloy with nodular graphite can be selected in such a manner that the saving in weight is at a maximum. On the attachment arm 9 it can be seen how further wall regions 20 of the first support part 2, which are arranged at an angle to further wall regions 21 of the second support part 3, are formed such that they are substantially thinner than the further wall regions 21 of the second support part 3. A considerable saving in material is possible particularly in the region in which the brake support arms 14, 15 are connected to the second support part 3, because here, as compared to the conventional casting process in one part, undercuts are no longer required. The construction of the molds for the production in two parts is simplified further because, unlike the production in one part, core inserts are not required.

Figure 4:
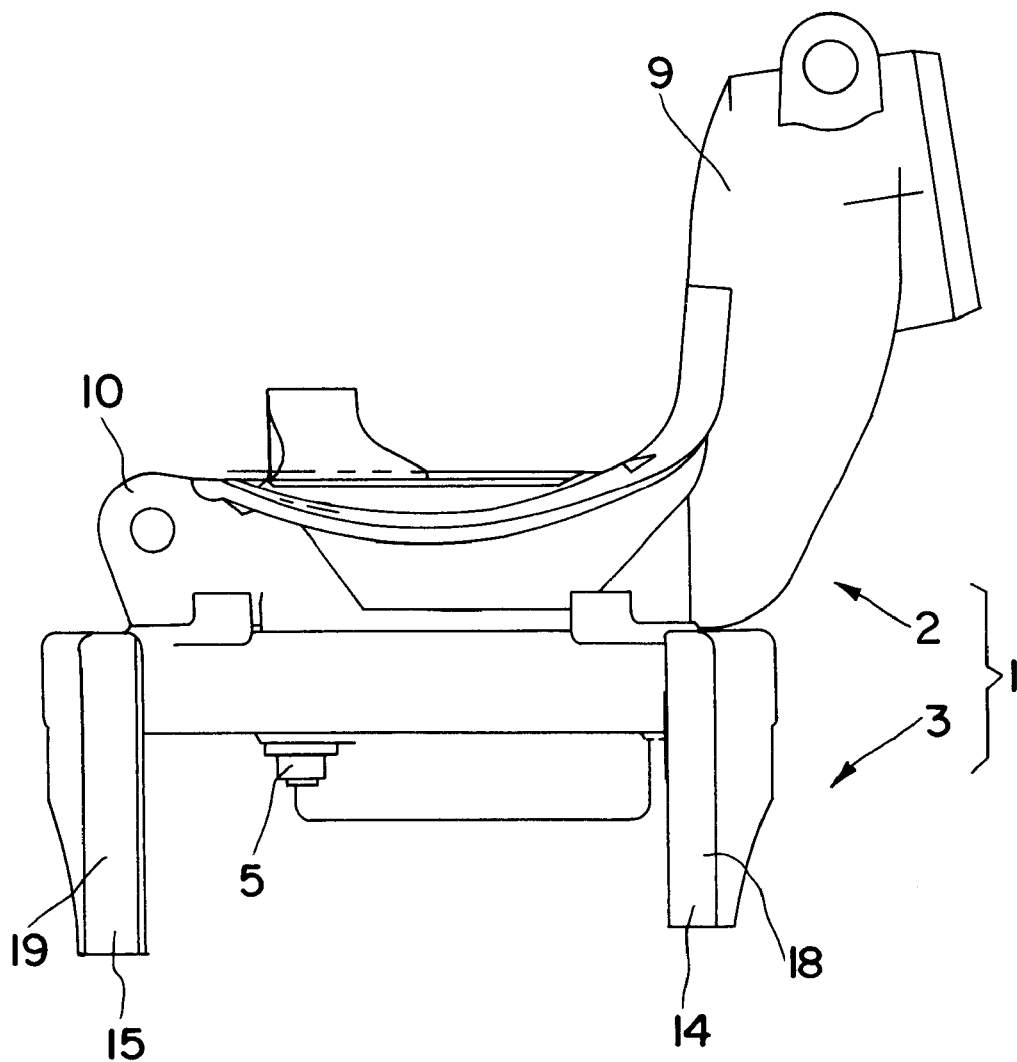
FIG. 4 shows a side view of the support arrangement of FIG. 1 illustrating the difference in thickness of the support arms.

FIG. 4 shows the support arrangement 1 as viewed from a side. It can be seen how the shaping can be simplified by the skillful selection of the separating line between the first support part and the second support part, and in which wall regions material can be omitted. Overall, a saving in weight of up to 35% can be achieved with production in two parts as compared to production in one part.

What is claimed is:

1. A support arrangement for use in a motor vehicle having a brake device, a suspension strut, a steering device and a wheel bearing, comprising: a first support part for connection to the suspension strut and to the steering device of the motor vehicle, and a second support part for holding the wheel bearing, the first support part and the second support part being connected to each other by means of screws, and first and second brake support arms being formed on the second support part for attachment of the brake device, wherein the first brake support arm has regions which are formed such that they are substantially thinner than corresponding regions of the second brake support arm wherein the first support part has wall regions for connection to the suspension strut and to the steering device of the motor vehicle, said wall regions being substantially thinner in some areas than adjacent wall regions of the second support part, the first support part enclosing an angle of $\alpha<180°$ with the second support part.

2. The support arrangement as claimed in claim 1, wherein the first brake support arm has wall regions which are formed such that they are at least 20% thinner than a corresponding wall region of the second brake support arm.

3. The support arrangement as claimed in claim 1, wherein the first brake support arm has wall regions which are formed such that they are at least 40%, thinner than a corresponding wall region of the second brake support arm.

4. The support arrangement as claimed in claim 1, wherein the wall regions of the first support part and of the second support part have apertures.

5. The support arrangement as claimed in claim 1, wherein wall regions of the first support part are thinner than wall regions of the second support part corresponding to their supporting function.

6. The support arrangement as claimed in claim 1, wherein wall regions of the first support part and of the second support part have profiles corresponding to their supporting function.

7. The support arrangement as claimed in claim 1, wherein the first support part is formed of an aluminum alloy casting.

8. The support arrangement as claimed in claim 7, wherein the second support part is formed of a cast iron alloy with nodular graphite.

* * * * *